Figure 1:
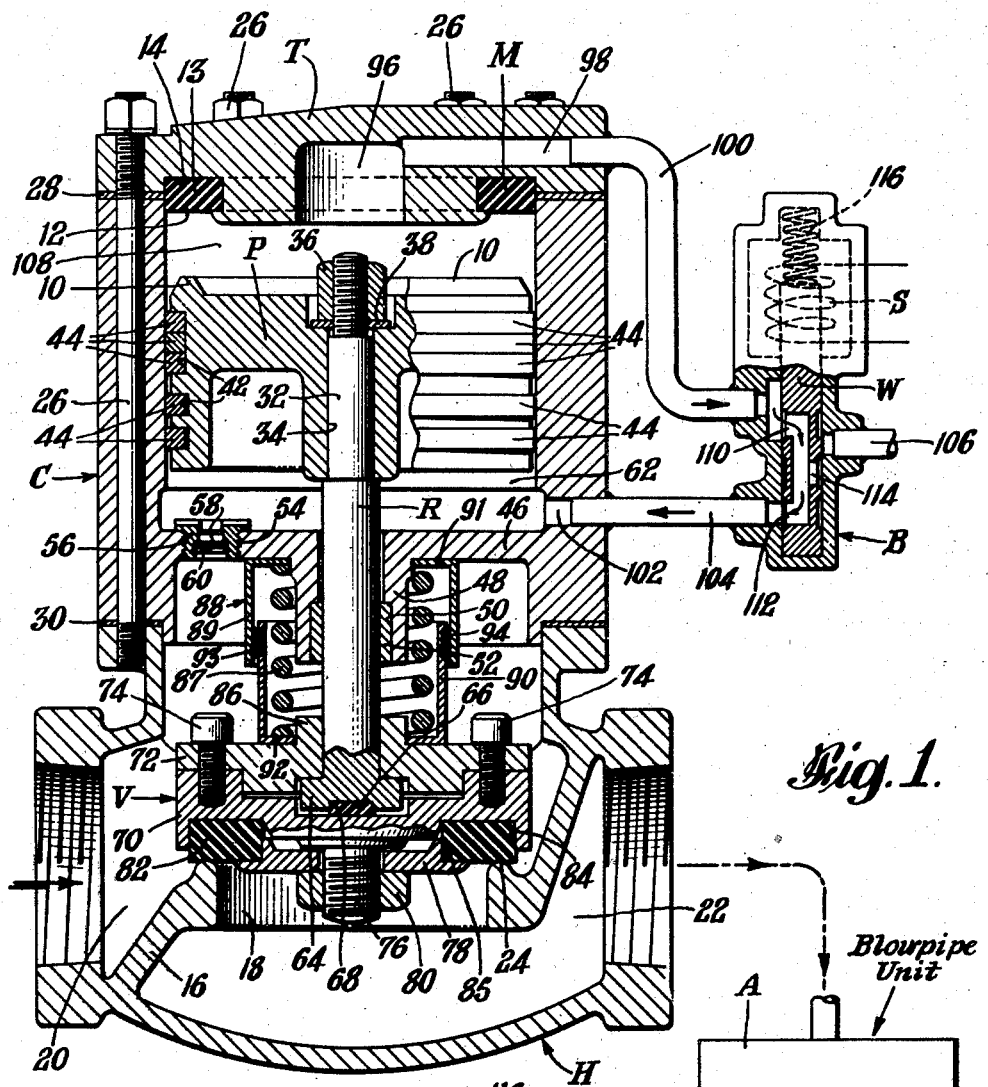

INVENTORS
ALFRED J. MILLER
LLOYD W. YOUNG
ATTORNEY

Patented Apr. 13, 1948

2,439,523

UNITED STATES PATENT OFFICE 2,439,523

PISTON-OPERATED VALVE MECHANISM

Alfred J. Miller, Garwood, and Lloyd W. Young, Elizabeth, N. J., assignors to The Linde Air Products Company, a corporation of Ohio Application July 15, 1944, Serial No. 545,062

5 Claims. (Cl. 137—139)

This invention relates to a piston-operated valve mechanism and more particularly to a remotely controlled high-capacity cutting oxygen supply valve for thermochemical desurfacing equipment and the like.

The main objects of this invention are to provide: a pilot-operated valve mechanism that is not subject to sticking; a pilot-operated supply valve mechanism which is suitable for high-capacity oxygen service; a cutting oxygen supply valve mechanism that is simply and easily produced, reliable in operation for an extended period of time, and which is inexpensive to manufacture and operate; a valve-operating fluid-pressure actuated piston provided with sealing means for preventing fluid leakage while the main valve is held in open position by the piston; and a valve mechanism of this type in which the relatively movable metallic parts are protected from particles of scale and other foreign matter which might be present in the oxygen or other highly active fluid the supply of which is controlled by the main valve.

Figure 2:
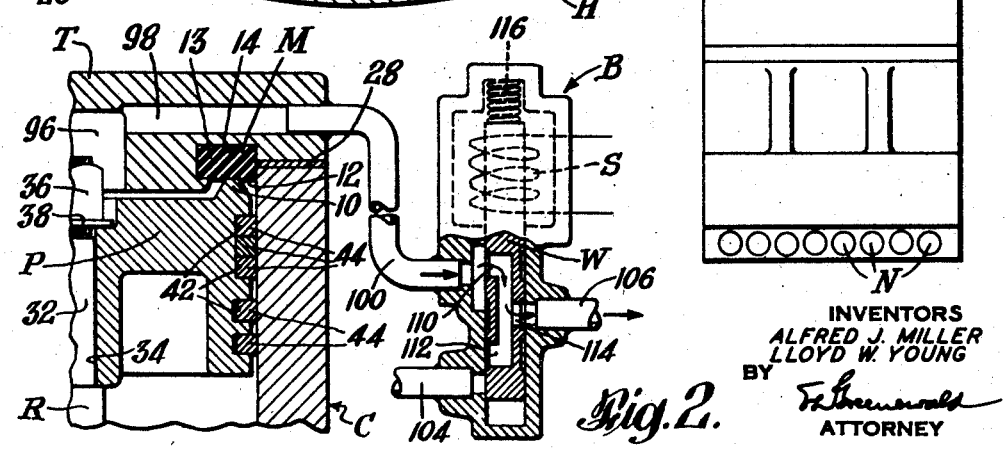

In the drawings:

Figure 1 is a view mainly in vertical cross section of a cutting oxygen supply valve mechanism exemplifying the invention; and Figure 2 is a fragmentary view similar to Figure 1, showing the position of the parts when the main valve is in open position.

Referring to the drawings, cutting or desurfacing oxygen under pressure is supplied to a blowpipe unit A, including a bank of nozzles N, from a suitable source of supply (not shown) through a conduit or supply pipe including a main valve housing H. A cylinder C, containing a piston P, is mounted on the housing H, the piston P being connected to a cutting oxygen supply valve V in the housing H by a stem or rod R. Mounted on the cylinder C is a pilot valve body B containing a pilot valve W for controlling the operation of the piston P, which controls the operation of the main valve V. The pilot valve W is operated by a solenoid S, supported by the body B and remotely energized or controlled in any suitable manner. Figure 1 shows the position of the parts when the main valve V is closed; and Figure 2, the position of the piston P and pilot valve W when the main valve V is open. Leakage of oxygen to the atmosphere is inhibited in the latter position of the parts by oxygen pressure-closed sealing means M located between the top of the piston P and a head or cap T of the cylinder C. Such sealing means M preferably comprises an annular flange 10 formed at the upper end of the piston P, and a seat 12 composed of suitable sealing material in the form of a relatively thick ring 13 which is seated in an annular groove 14 in the cap T facing the flange 10. The ring is preferably cemented in place in the groove. Thus, when the piston P is forced upwardly by the oxygen pressure to open the main valve V, further movement of the piston is stopped by the sealing means M, and a very effective fluid seal is thus provided between the flange 10 and the seat 12, which inhibits oxygen leakage.

The valve housing H is provided with an integral partition 16 having a central opening 18. The partition 16 divides the housing H into an oxygen inlet chamber 20 and an oxygen outlet chamber 22. On the inlet side of the opening 18, the partition 16 is provided with an annular valve seat 24. The housing H, cylinder C and cap T are secured together by bolts 26. Suitable fluid-sealing gaskets 28 and 30 are provided between the cap and the cylinder, and between the cylinder and the housing, respectively, to prevent any leakage of oxygen to the atmosphere. The connecting rod R is provided with a portion 32 of reduced diameter at one end which extends through and fits a corresponding hole 34 extending through the center of the piston P. The rod R and piston P are secured together by a nut 36, a washer 38 being disposed between the nut and the piston. A cotter-pin (not shown) may be provided for preventing any movement between the rod and the nut. The external periphery of the piston P is provided with suitable annular grooves 42 in which are seated piston rings 44 which slidably engage the inner wall of the cylinder C, minimizing oxygen leakage between the cylinder and piston, and insuring positive operation of the piston by the fluid under pressure the flow of which is being controlled by the main valve V.

The cylinder C is provided with an internal annular shoulder or wall 46 having a downwardly extending flange 48 closely surrounding the rod R. A downwardly and inwardly facing annular recess 50 is provided in the flange 48 for receiving and seating an annular bearing sleeve 52 in which the rod R is adapted to slide. A threaded port 54 in the shoulder 46 is provided with a filter retainer 56 containing an oxygen strainer 58 which is held in place by a retaining ring 60. Oxygen under pressure in the inlet chamber 20 in the housing H thus communicates, through the strainer 58, with the compartment 62 beneath the piston P in the cylinder C. Entrained foreign matter and undesirable particles of rust or scale in the oxygen are prevented from entering the compartment 62 by the filtering action of the strainer 58.

The lower end of the rod R is provided with an external annular flange 64 and a downwardly facing central socket 66. A resilient member 68 is seated in the socket 66 and is held in place by a holder 70 which is secured to an annular retainer 72 by cap screws 74. The resilient member 68 thus serves to eliminate all end play between the parts when the screws 74 are tightened. The central portion of the retainer 72 is mounted on the rod R and engages the flange 64. The holder 70 is provided with a depending central lug 76 on which is mounted an annular plate 78 and a nut 80. A main valve member 82 consisting of a relatively thick ring of suitable material is held in place in a downwardly facing groove 84 in the holder 70, by the plate 78 which is provided with an upwardly and outwardly facing seat 85 receiving the corresponding annular corner of the ring 82. The ring 82 is adapted to engage the annular valve seat 24 and prevent any leakage of oxygen when the main valve V is in closed position.

The retainer 72 is provided with an upstanding flange 86 directly below the downwardly depending flange 48 of the shoulder 46. The main valve V is biased towards its closed position by a compression spring 87 which surrounds the flanges 48 and 86 and is disposed between the shoulder 46 and the retainer 72. The spring 87 is provided with a protective casing 88 comprising telescoped parts 89 and 90. The upper part 89 of the casing has an inturned annular flange 91 disposed between the spring and shoulder 46. The lower part 90 also is provided with an inturned annular flange 92 seated on the retainer 72 and held in place by the lower end of the spring. This part 90 is also provided with an external annular groove 93 in which is seated a ring 94 of suitable filter material which slidably engages the internal annular surface of the other part 89. Thus, the casing parts are free to move axially with respect to each other, with movement of the rod R, while protecting the spring and working center of the rod from any foreign particles or other matter that might be entrained in the oxygen, as well as from any rapidly moving oxygen, insuring trouble-free operation of the parts.

The cylinder head or cap T is provided with a central recess 96 facing the upper end of the rod R, and a passage 98, the latter being connected to pilot valve body B by a pipe 100. Below the piston P, the cylinder C is provided with a passage 102 which is connected to the pilot valve body by a pipe 104. Another pipe 106 connects the pilot valve body B to the atmosphere. In one position of the pilot valve W, compartment 108 in the cylinder above the piston is placed in communication with the compartment 62 below the piston by passages 110 and 112 in the pilot valve. In another position of the pilot valve W, the compartment 108 above the piston P in the cylinder C is placed in communication with the atmosphere by the passages 110 and 114 in the pilot valve W. The pilot valve W is operated by the solenoid S to either one of such two positions.

In operation, when it is desired to supply cutting oxygen to the blowpipe unit A from a suitable source of oxygen under pressure, the solenoid S is energized to cause the pilot valve W to move from the position shown in Figure 1 to that shown in Figure 2. In the latter position of the pilot valve W, the compartment 108 in the cylinder C above the piston P is open to the atmosphere, and oxygen under pressure forces the piston P to its uppermost position, effectively closing the fluid sealing means M at the top of the cylinder, and holding the main valve V in open position. When it is desired to shut off the supply of oxygen to the blowpipe unit A, the solenoid S is de-energized, causing the pilot valve W to be moved back to the position shown in Fig. 1 by spring 116. This equalizes the fluid pressure in the oxygen compartments in the cylinder C above and below the piston P, causing the compression spring 87, assisted by gravity, to close the main valve V.

Thus, according to the invention, there is provided a pilot-operated valve that is virtually free of operating troubles, such as sticking and the like, which were present in prior pilot-operated valves. The latter are so designed that close tolerances are necessary between moving parts, which frequently caused such valves to stick open or closed. In the present invention, however, no close fits are required, making the operation of the valve virtually trouble-free.

We claim:

1. In a high-capacity oxygen supply valve mechanism, the combination comprising, a cylinder having an internal annular wall provided with a cylindrical flange having an internal recess, a bearing sleeve secured in said recess, a piston disposed in said cylinder on one side of said wall, a valve housing secured to said cylinder, said housing having an oxygen fluid inlet chamber opening to the other side of said wall, a valve in said chamber, a connecting rod secured at one end to said piston and at the other end to said valve, said rod having a sliding fit with said sleeve, said valve having an annular shoulder provided with a flange facing said first-named flange, a valve-closing compression spring disposed around said flanges, and a protective casing for said spring comprising telescoped parts one of which is held against one flange and the other against the other flange by said spring, and an annular filter secured to one of said parts and slidably engaging the other.

2. A piston operated cutting oxygen valve mechanism comprising, in combination, a main valve housing having an oxygen inlet chamber, a main valve in said chamber, a rod connected to said valve, a spring biasing said valve toward closed position, a protective casing for said spring, a piston connected to said rod, a cylinder for said piston having compartments at each end of said piston, an oxygen port provided with a strainer between said chamber and one of said compartments, pilot valve means placing the other compartment in communication with the atmosphere in one position, and placing said compartments in communication with each other in another position, and means providing an oxygen seal in the compartment which is placed in communication with the atmosphere so that oxygen leakage is inhibited when the main valve is held in open position by the pressure of the oxygen acting on said piston in the opposite compartment.

3. A valve mechanism comprising, in combination, a cylinder having an internal annular shoulder provided with a flange, said flange having an internal annular recess, an annular bearing seated in said recess, a valve-operating piston rod extending through said bearing in sliding contact therewith, said rod having an external annular flange and a central socket at one end, a resilient member seated in said socket, a retainer mounted on said rod in engagement with said flange, a holder secured to said retainer in engagement with said resilient member, said holder having a central lug and an annular groove, a valve member disposed in said groove, a disc mounted on said lug and holding said valve member in place, a spring disposed between said shoulder and retainer, and protective casing for said spring comprising a pair of telescoped parts having internal annular flanges disposed between the opposite ends of said spring and the shoulder and retainer respectively, one of said parts having an annular groove, and a filter ring mounted in said groove and slidably engaging the other part.

4. A piston operated fluid supply valve mechanism comprising, in combination, a main valve housing having a fluid inlet chamber, a main valve in said chamber, a member connected to said valve, means biasing said valve toward closed position, a protective casing for said means, a piston connected to said member, a cylinder for said piston having compartments at each end of said piston, a fluid port provided with a strainer between said chamber and one of said compartments, pilot valve means for placing the other compartment in communication with an outlet in one position, and for placing said compartments in communication with each other in another position, and means providing a fluid seal in the compartment which is placed in communication with the outlet so that fluid leakage is inhibited when the main valve is held in open position by the pressure of the fluid acting on said piston in the opposite compartment.

5. In a fluid supply valve mechanism, the combination comprising, a compression spring for biasing the valve in one direction, a protective casing for said spring including a pair of hollow telescoped parts, and means comprising said spring holding said parts in place with respect to said spring, and fluid filter means in combination with said protective casing for preventing foreign particles in the fluid from entering the casing.

ALFRED J. MILLER.
LLOYD W. YOUNG.

REFERENCES CITED

The following references are of record in the file of this patent:

UNITED STATES PATENTS

| Number | Name | Date |
|---|---|---|
| 121,659 | Prescott | Dec. 5, 1871 |
| 320,280 | Pearson | June 16, 1885 |
| 478,949 | Berry | July 12, 1892 |
| 780,754 | Junggren | Jan. 24, 1905 |
| 804,413 | King | Nov. 14, 1905 |
| 824,658 | Junggren | June 26, 1906 |
| 960,602 | Turnbull | June 7, 1910 |
| 1,322,645 | Steuer | Nov. 25, 1919 |
| 1,566,814 | Bliss | Dec. 22, 1925 |
| 2,219,761 | Burdick | Oct. 29, 1940 |
| 2,303,152 | Weeks | Nov. 24, 1942 |

FOREIGN PATENTS

| Number | Country | Date |
|---|---|---|
| 486,973 | France | Feb. 28, 1918 |
| 551,248 | Great Britain | Feb. 15, 1943 |
| 635,935 | France | Jan. 3, 1928 |